(12) United States Patent
Li et al.

(10) Patent No.: US 11,540,242 B2
(45) Date of Patent: Dec. 27, 2022

(54) METHODS AND APPARATUSES FOR TRANSMITTING AND RECEIVING REFERENCE SIGNAL, BASE STATION AND USER EQUIPMENT

(71) Applicant: BEIJING XIAOMI MOBILE SOFTWARE CO., LTD., Beijing (CN)

(72) Inventors: Mingju Li, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/145,366

(22) Filed: Jan. 10, 2021

(65) Prior Publication Data
US 2021/0136710 A1  May 6, 2021

Related U.S. Application Data

(63) Continuation of application No. PCT/CN2018/095305, filed on Jul. 11, 2018.

(51) Int. Cl.
*H04W 56/00* (2009.01)
*H04L 5/00* (2006.01)
(Continued)

(52) U.S. Cl.
CPC ......... *H04W 56/006* (2013.01); *H04L 5/0051* (2013.01); *H04W 16/14* (2013.01); *H04W 72/005* (2013.01)

(58) Field of Classification Search
None
See application file for complete search history.

(56) References Cited

U.S. PATENT DOCUMENTS

2017/0150461 A1   5/2017 Li et al.
2019/0387485 A1*  12/2019 Ko ..................... H04L 5/0053
(Continued)

FOREIGN PATENT DOCUMENTS

CN  101594336 A  12/2009
CN  104219757 A  12/2014
(Continued)

OTHER PUBLICATIONS

European Patent Office, Extended European Search Report Issued in Application No. 18926032.6, dated Jul. 2, 2021, Germany, 14 pages.
(Continued)

*Primary Examiner* — Chae S Lee
(74) *Attorney, Agent, or Firm* — Syncoda LLC; Feng Ma

(57) ABSTRACT

A method of transmitting the reference signal includes: obtaining a plurality of candidate transmission positions of a reference signal according to an initial candidate transmission position of the reference signal, where the plurality of candidate transmission positions include the initial candidate transmission position; performing a channel detection before the reference signal is transmitted; and if channel idle is detected, transmitting the reference signal at a corresponding candidate transmission position, wherein reference signal position information carried by the reference signal comprises a reference signal index corresponding to the initial candidate transmission position and an offset between a current candidate transmission position and the initial candidate transmission position.

19 Claims, 6 Drawing Sheets

(51) Int. Cl.
*H04W 16/14* (2009.01)
*H04W 72/00* (2009.01)

(56) References Cited

U.S. PATENT DOCUMENTS

| | | | | |
|---|---|---|---|---|
| 2021/0105644 A1* | 4/2021 | Mo | ........................ | H04W 24/08 |
| 2021/0144660 A1* | 5/2021 | Oh | ..................... | H04W 56/0015 |

FOREIGN PATENT DOCUMENTS

| | | | | |
|---|---|---|---|---|
| CN | 105594241 | A | 5/2016 | |
| CN | 106686604 | A | 5/2017 | |
| CN | 107294686 | A | 10/2017 | |
| CN | 107528682 | A | 12/2017 | |
| CN | 107528682 | B * | 12/2020 | ........... H04L 5/0048 |
| EP | 3232703 | A1 | 10/2017 | |
| WO | 2017000099 | A1 | 1/2017 | |
| WO | 2017074496 | A1 | 5/2017 | |
| WO | 2019203568 | A | 10/2019 | |

OTHER PUBLICATIONS

CATT, "NR PBCH RE mapping in SS Block", 3GPP TSG RAN WG1 Meeting#90, Prague, Czechia, R1-1712352, Aug. 21-25, 2017, 5 pages.

FiberHome, "Discussion on time index indication", 3GPP TSG-RAN WG1 Meeting#90, Prague, CZ, R1-1712275, Aug. 21-25, 2017, 3 pages.

ISA State Intellectual Property Office of the People's Republic of China, International Search Report Issued in Application No. PCT/CN2018/095305, dated Feb. 19, 2019, WIPO, 4 pages.

CN Written Opinion of the International Searching Authority issued in Application No. PCT/CN2018/095305, dated Feb. 19, 2019.

Huawei, HiSilicon: Support for UE synchronization and detection on a LAA Scell, 3GPP TSG RAN WG1 Meeting #80bis, Belgrade, Serbia, Apr. 20-24, 2015, R1-151299.

CN First Office Action in Application No. 201880001030.0, dated Jul. 30, 2020.

European Patent Office, Office Action Issued in Application No. 18926032.6, dated Apr. 11, 2022, Netherlands, 11 pages.

State Intellectual Property Office of the People's Republic of China, Office Action and Search Report Issued in Application No. 202110412365.5, dated Jul. 13, 2022, 17 pages. (Submitted with Machine/Partial Translation).

European Patent Office, Office Action Issued in Application No. 18926032.6, dated Aug. 31, 2022, Netherlands, 7 pages.

* cited by examiner

METHODS AND APPARATUSES FOR TRANSMITTING AND RECEIVING REFERENCE SIGNAL, BASE STATION AND USER EQUIPMENT

CROSS-REFERENCE TO RELATED APPLICATIONS

This application is a continuation of International Application No. PCT/CN2018/095305 filed on Jul. 11, 2018, the disclosure which is hereby incorporated by reference in its entirety.

BACKGROUND

Under a New Radio (NR) licensed spectrum, each slot includes 14 symbols, and how many slots are included in 1 millisecond (ms) is determined by subcarrier spacing. For example, when the subcarrier spacing is 15 kilohertz (KHz), there is 1 slot in 1 ms; when the subcarrier spacing is 30 KHz, there are 2 slots in 1 ms; and when the subcarrier spacing is 60 KHz, there are 4 slots in 1 ms, and so on.

SUMMARY

The present disclosure relates generally to the field of communication technologies, and more specifically to a method and apparatus for transmitting a reference signal, a method and apparatus for receiving a reference signal, a base station, user equipment (UE), and computer-readable storage media.

Various embodiments can enable the UE to achieve synchronization with a cell where the UE is located through an unlicensed spectrum in the time domain while increasing the transmission opportunities of an SSB.

According to a first aspect of the embodiments of the present disclosure, a method of transmitting a reference signal is provided. The method is applicable to a base station, and the method includes:

obtaining a plurality of candidate transmission positions of a reference signal according to an initial candidate transmission position of the reference signal, where the plurality of candidate transmission positions include the initial candidate transmission position;

performing a channel detection before the reference signal is transmitted; and in response to the detection that the channel is idle, transmitting the reference signal at a corresponding candidate transmission position, where reference signal position information carried by the reference signal includes a reference signal index corresponding to the initial candidate transmission position and an offset between a current candidate transmission position and the initial candidate transmission position.

In some embodiments, obtaining the plurality of candidate transmission positions of the reference signal according to the initial candidate transmission position of the reference signal includes:

obtaining the plurality of candidate transmission positions by overall shifting signals included in the reference signal from the initial candidate transmission position of the reference signal.

In some embodiments, the method further includes:

determining a corresponding offset according to an overall shifting amount between each candidate transmission position and the initial candidate transmission position.

In some embodiments, the reference signal includes a synchronization signal block (SSB) or a signal including the SSB; and the offset is indicated by one or more reserved bits in a physical broadcast channel (PBCH) within the SSB, the offset is indicated by adding one or more bits in the PBCH within the SSB, or the offset is indicated by adding one or more demodulation reference signal (DMRS) sequences.

According to a second aspect of the embodiments of the present disclosure, a method of receiving a reference signal is provided. The method is applicable to UE, and the method includes:

receiving a reference signal from a base station;

obtaining all signals in the reference signal by detecting a target signal in the reference signal;

obtaining a reference signal index corresponding to an initial candidate transmission position of the reference signal and an offset between a current candidate transmission position of the reference signal and the initial candidate transmission position by demodulating all the signals in the reference signal; and performing synchronization in a time domain with the base station according to the reference signal index and the offset.

In some embodiments, obtaining all the signals in the reference signal by detecting the target signal in the reference signal includes:

obtaining a position of the target signal by detecting the target signal in the reference signal; and obtaining all the signals in the reference signal according to the position of the target signal.

In some embodiments, the reference signal includes a synchronization signal block (SSB) or a signal including the SSB; and the offset is indicated by one or more reserved bits in a physical broadcast channel (PBCH) within the SSB, the offset is indicated by adding one or more bits in the PBCH within the SSB, or the offset is indicated by adding one or more demodulation reference signal (DMRS) sequences.

According to a third aspect of the embodiments of the present disclosure, an apparatus for transmitting a reference signal is provided. The apparatus is applicable to a base station, and the apparatus includes:

an obtaining module configured to obtain a plurality of candidate transmission positions of a reference signal according to an initial candidate transmission position of the reference signal, where the plurality of candidate transmission positions include the initial candidate transmission position;

a detecting module configured to perform a channel detection before the reference signal is transmitted at each candidate transmission position obtained by the obtaining module; and a transmitting module configured to transmit the reference signal at a corresponding candidate transmission position if channel idle is detected by the detecting module, where a reference signal index carried by the reference signal includes a reference signal index corresponding to the initial candidate transmission position and an offset between a current candidate transmission position and the initial candidate transmission position.

In some embodiments, the obtaining module is configured to:

obtain the plurality of candidate transmission positions by overall shifting signals included in the reference signal from the initial candidate transmission position of the reference signal.

In some embodiments, the apparatus further includes:

a determining module configured to determine a corresponding offset carried in the reference signal transmitted by the transmitting module according to an overall shifting amount between each candidate transmission position and the initial candidate transmission position.

In some embodiments, the reference signal includes a synchronization signal block (SSB) or a signal including the SSB; and the offset is indicated by one or more reserved bits in a physical broadcast channel (PBCH) within the SSB, the offset is indicated by adding one or more bits in the PBCH within the SSB, or the offset is indicated by adding one or more demodulation reference signal (DMRS) sequences.

According to a fourth aspect of the embodiments of the present disclosure, an apparatus for receiving a reference signal is provided. The apparatus is applicable to UE, and the apparatus includes:

a receiving module configured to receive a reference signal from a base station;

a detecting module configured to obtain all signals in the reference signal received by the receiving module by detecting a target signal in the reference signal;

a demodulating module configured to obtain a reference signal index corresponding to an initial candidate transmission position of the reference signal and an offset between a current candidate transmission position of the reference signal and the initial candidate transmission position by demodulating all the signals in the reference signal obtained by the detecting module; and a synchronizing module configured to perform synchronization with the base station in a time domain according to the reference signal index and the offset which are obtained by the demodulating module.

In some embodiments, the detecting module includes:

a detecting sub-module configured to obtain a position of the target signal by detecting the target signal in the reference signal; and an obtaining sub-module configured to obtain all the signals in the reference signal according to the position of the target signal acquired by the detecting sub-module.

In some embodiments, the reference signal includes a synchronization signal block (SSB) or a signal including the SSB; and the offset is indicated by one or more reserved bits in a physical broadcast channel (PBCH) within the SSB, the offset is indicated by adding one or more bits in the PBCH within the SSB, or the offset is indicated by adding one or more demodulation reference signal (DMRS) sequences.

According to a fifth aspect of the embodiments of the present disclosure, a base station is provided. The base station includes:

a processor, and memory for storing instructions executable by the processor;

where, the processor is configured to:

obtain a plurality of candidate transmission positions of a reference signal according to an initial candidate transmission position of the reference signal, where the plurality of candidate transmission positions include the initial candidate transmission position;

perform a channel detection before the reference signal is transmitted; and in response to that channel idle is detected, transmit the reference signal at a corresponding candidate transmission position, where reference signal position information carried by the reference signal includes reference signal position information corresponding to the initial candidate transmission position and an offset between the current candidate transmission position and the initial candidate transmission position.

According to a sixth aspect of the embodiments of the present disclosure, user equipment is provided. The user equipment includes:

a processor, and memory for storing instructions executable by the processor;

where, the processor is configured to:

receive a reference signal from a base station;

obtain all signals in the reference signal by detecting a target signal in the reference signal;

obtain a reference signal index corresponding to an initial candidate transmission position of the reference signal and an offset between a current candidate transmission position of the reference signal and the initial candidate transmission position by demodulating all the signals in the reference signal; and perform synchronization with the base station in a time domain according to the reference signal index and the offset.

According to a seventh aspect of the embodiments of the present disclosure, a computer-readable storage medium is provided. The storage medium stores computer instructions, and the instructions are executed by a processor to implement the steps of the method of transmitting a reference signal as described above.

According to an eighth aspect of the embodiments of the present disclosure, a computer-readable storage medium is provided. The storage medium stores computer instructions, and the instructions are executed by a processor to implement the steps of the method of receiving a reference signal as described above.

It should be understood that the above general description and the following detailed description are merely exemplary and explanatory and do not limit the disclosure.

BRIEF DESCRIPTION OF THE DRAWINGS

The accompanying drawings, which are incorporated in and constitute a part of this disclosure, illustrate examples consistent with the present disclosure and, together with the description, serve to explain the principles of the disclosure.

DETAILED DESCRIPTION

Figure 1:
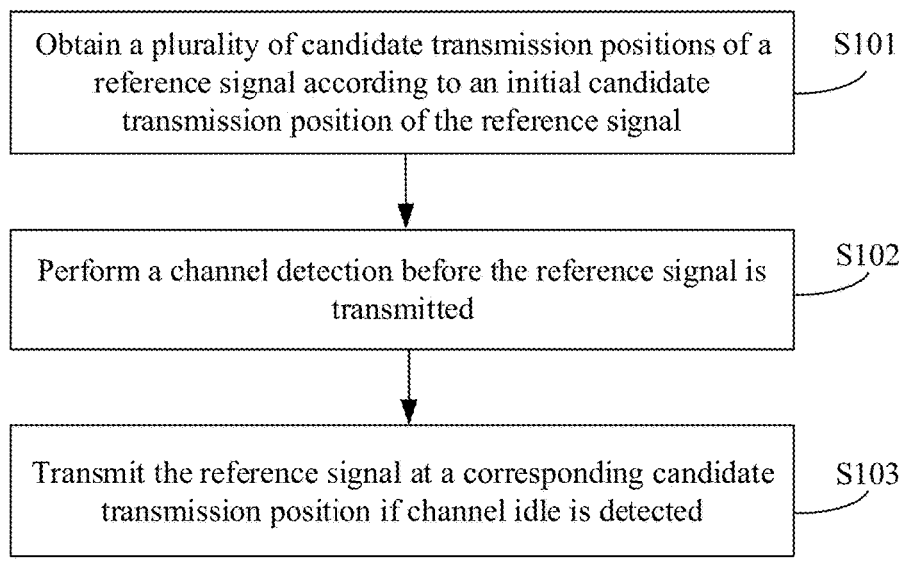
FIG. 1 is a flowchart illustrating a method of transmitting a reference signal according to some embodiments of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

In NR, a Synchronization Signal Block (SSB) is proposed to reduce the overhead by reducing always on reference signals. Each SSB occupies 4 consecutive symbols, which include respectively a Primary Synchronization Signal (PSS), a Physical Broadcast Channel (PBCH), a Secondary Synchronization Signal (SSS), and the PBCH in order. 12 Resource Blocks (RBs) in the middle of a symbol where the SSS is located are occupied by the SSS, and 4 RBs on each side of the symbol are occupied by the PBCH. Some subcarriers in the PBCH are used as a Demodulation Reference Signal (DMRS). The subcarrier spacing of the SSB can be 15 KHz, 30 KHz, 120 KHz and 240 KHz. All SSBs are sent within 5 ms. To support beam transmission, when there is a beam, each beam needs to send an SSB, so the maximum number of SSBs that can be sent within 5 ms is 4 (when a carrier frequency is below 3 GHz) or 8 (when a carrier frequency is 3 GHz to 6 GHz) or 64 (when a carrier frequency is above 6 GHz), and the multiple SSBs within 5 ms are called an SSB burst set. A period of the SSB burst set may be 5 ms, 10 ms, 20 ms, 40 ms, etc.

When subcarrier spacing of an SSB is 15 KHz, a time domain distribution of SSBs is that symbols having indexes of 2 to 5 and 8 to 11 are occupied in every 14 symbols. When the subcarrier spacing is 15 KHz, the maximum number of the SSBs is 4 or 8, in this way, the first symbols of the SSBs have indexes {2, 8}+14*n, where n equals 0, 1 or n equals 0, 1, 2, 3. An index of a symbol represents a position of the symbol in a slot.

When subcarrier spacing of an SSB is 30 KHz, a first time domain distribution of SSBs is that symbols having indexes of 2 to 5 and 8 to 11 are occupied in every 14 symbols. When the subcarrier spacing is 30 KHz, the maximum number of the SSBs is 4 or 8, in this way, the first symbols of the SSBs have indexes {2, 8}+14*n, where n equals 0, 1 or n equals 0, 1, 2, 3.

When subcarrier spacing of an SSB is 30 KHz, a second time domain distribution of SSBs is that symbols having indexes of 4 to 7, 8 to 11, 16 to 19, and 20 to 23 are occupied in every 28 symbols. When the subcarrier spacing is 30 KHz, the maximum number of the SSBs is 4 or 8, in this way, the first symbols of the SSBs have indexes {4, 8, 16, 20}+28*n, where n equals 0 or n equals 0, 1.

When subcarrier spacing of an SSB is 120 KHz, a time domain distribution of SSB is that symbols having indexes of 4 to 7, 8 to 11, 16 to 19, and 20 to 23 are occupied in every 28 symbols. When the subcarrier spacing is 120 KHz, the maximum number of the SSBs is 64, in this way, the first symbols of the SSBs have indexes {4, 8, 16, 20}+28*n, where n equals 0, 1, 2, 3, 5, 6, 7, 8, 10, 11, 12, 13, 15, 16, 17, 18.

When subcarrier spacing of an SSB is 240 KHz, a time domain distribution of SSBs is that symbols having indexes of 8 to 11, 12 to 15, 16 to 19, 20 to 23, 32 to 35, 36 to 39, 40 to 43, and 44-47 are occupied in every 56 symbols. When the subcarrier spacing is 240 KHz, the maximum number of the SSBs is 64, in this way, the first symbols of the SSBs have indexes {8, 12, 16, 20, 32, 36, 40, 44}+56*n, where n equals 0, 1, 2, 3, 5, 6, 7, 8.

In a NR licensed spectrum, a channel is available at any time, so each SSB can be transmitted on a corresponding fixed resource in the time/frequency domain as long as a base station wants to transmit the SSB. At the same time, transmission of an SSB carries a respective SSB index, such that a terminal can synchronize with the base station in the time domain according to the detected SSB index and a symbol position of an SSB corresponding to the SSB index written to the terminal.

However, in a NR unlicensed spectrum, a channel where the unlicensed spectrum is located is not readily available. The base station may need to check if the channel is idle before sending any signal, and if the channel is idle, the signal can be sent. For example, taking the case that there are up to 4 candidate transmission positions of SSBs within 5 ms at subcarrier spacing of 15 KHz as an example, SSB #0 is sent at symbols having indexes of 2 to 5 of the first slot, and if no channel idle is detected before a symbol having an index of 2, SSB #0 will not be sent. SSB #1 is sent at symbols having indexes of 8 to 11 of the first slot, and if no channel idle is detected before a symbol having an index of 8, SSB #1 will not be sent. Finally, SSB transmission opportunities are very low, such that the terminal cannot synchronize with the base station in the time domain.

FIG. 1 is a flowchart illustrating a method of transmitting a reference signal according to some embodiments of the present disclosure. The embodiment is described from a base station side. As shown in FIG. 1, the method of transmitting a reference signal includes the following.

At step S101, a plurality of candidate transmission positions of a reference signal are obtained according to an initial candidate transmission position of the reference signal, where the plurality of candidate transmission positions of the reference signal include the initial candidate transmission position of the reference signal.

The reference signal may include an SSB, or a signal including an SSB, such as a discovery signal in an unlicensed spectrum.

In the embodiment, the plurality of candidate transmission positions may be obtained by overall shifting signals included in the reference signal from the initial candidate transmission position of the reference signal.

The method may further include: determining a corresponding offset according to an overall shifting amount between each candidate transmission position and the initial candidate transmission position.

Figure 2:
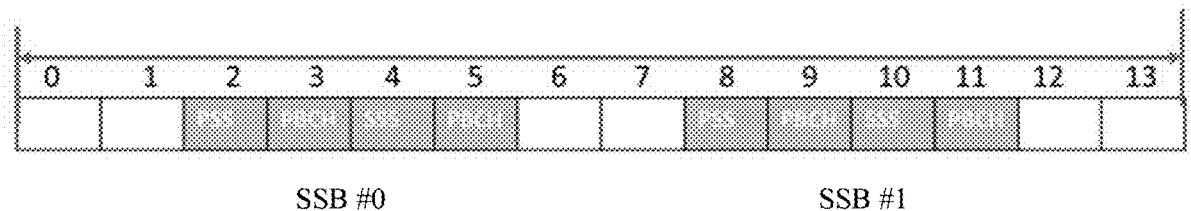
FIG. 2 is a schematic diagram illustrating symbol positions where SSBs are located according to some embodiments of the present disclosure.

To clearly describe a process of obtaining the multiple candidate transmission positions and determining the offset, SSB #0 shown in FIG. 2 is taken as an example for description. An initial candidate transmission position of SSB #0 in FIG. 2 is symbols having indexes of 2 to 5. Performing overall shifting on the signals included in SSB #0 in FIG. 2 may generate the following multiple candidate transmission positions.

Position 11: symbols having indexes of 0 to 3. The signals sent at the symbols having indexes of 0 to 3 are: a PSS, a PBCH, an SSS, and a PBCH, respectively. This position is shifted forward by 2 symbols relative to the initial candidate transmission position, e.g., the offset is −2.

Position 12: symbols having indexes of 1 to 4. The signals sent at the symbols having indexes of 1 to 4 are: a PSS, a PBCH, an SSS, and a PBCH, respectively. This position is shifted forward by 1 symbol relative to the initial candidate transmission position, e.g., the offset is −1.

Position 13: symbols having indexes of 2 to 5, which is the initial candidate transmission position. The offset is 0.

Position 14: symbols having indexes of 3 to 6. The signals sent at the symbols having indexes of 3 to 6 are: a PSS, a PBCH, an SSS, and a PBCH, respectively. This position is shifted backward by 1 symbol relative to the initial candidate transmission position, e.g., the offset is 1.

Position 15: symbols having indexes of 4 to 7. The signals sent at the symbols having indexes of 4 to 7 are: a PSS, a PBCH, an SSS, and a PBCH, respectively. This position is shifted backward by 2 symbols relative to the initial candidate transmission position, e.g., the offset is 2.

As can be seen, a plurality of candidate transmission positions can be obtained in the above manner. The more candidate transmission positions there are, the more offsets there are, and the more bits used to indicate an offset. In the embodiment, the offset may be limited, for example, only M symbols may be shifted backward, or only N symbols may be shifted forward, etc., where both M and N are integers greater than or equal to 0 and less than or equal to X. X may be set as required, for example, less than or equal to 8. In the embodiment, by limiting the offset, the base station can add as few bits as possible to signaling used to indicate the offset, thereby saving the signaling overhead of the PBCH.

The offset can be indicated in various ways. For example, an offset may be indicated by one or more reserved bits in a PBCH within an SSB, which may be one or more bits used to indicate an SSB index. In a scenario above 6 GHz, initial candidate transmission positions are at most 64, it needs 6 bits to indicate an SSB index, 3 bits of which are represented by DMRS sequences, and the other 3 bits are carried by PBCH signaling. In a scenario below 6 GHz, since initial candidate transmission positions of SSBs are at most 8, DMRS sequences can be used to indicate these initial candidate transmission positions, and bits in the PBCH reserved for indicating an SSB index can be used for indicating other information. Moreover, an offset may be indicated by adding one or more bits in a PBCH within an SSB (e.g., one or more new bits) or by adding one or more DMRS sequences (e.g., one or more new DMRS sequences).

For example, take the 3 bits in the PBCH within the SSB for indicating an offset as an example, where a correspondence between 3 bits for indicating an offset and offsets may be shown in Table 1:

TABLE 1

Correspondence between 3 bits for indicating an offset and offsets

| Bit | Offset | Remarks |
| --- | --- | --- |
| 000 | −3 | Shift forward by 3 symbols |
| 001 | −2 | Shift forward by 2 symbols |
| 010 | −1 | Shift forward by 1 symbol |
| 011 | 0 | No shift |
| 100 | 1 | Shift backward by 1 symbol |
| 101 | 2 | Shift backward by 2 symbols |

TABLE 1-continued

Correspondence between 3 bits for indicating an offset and offsets

| Bit | Offset | Remarks |
| --- | --- | --- |
| 110 | 3 | Shift backward by 3 symbols |
| 111 | 4 | Shift backward by 4 symbols |

At step S102, a channel detection is performed before the reference signal is transmitted.

At step S103, if channel idle is detected, the reference signal is transmitted at a corresponding candidate transmission position, where reference signal position information carried by the reference signal includes a reference signal index corresponding to the initial candidate transmission position and an offset between the current candidate transmission position and the initial candidate transmission position.

In an example, the current candidate transmission position is a candidate transmission position next to the moment of the detection that the channel is idle.

Continuing with the SSB shown in FIG. 2 as an example, if a base station detects channel idle before a 5 ms SSB burst set transmission window, the base station sends an SSB in symbols having indexes of 0 to 3 of the first slot, the sending sequence is always a PSS, a PBCH, an SSS, and a PBCH. SSB position information carried in the simultaneously transmitted SSB includes the numbering of SSB #0 (i.e., an SSB index) and information on an offset as shifting forward by 2 symbols. If the base station detects that the channel is idle on the first symbol of the first slot, that is, a symbol having an index of 0, the base station sends an SSB in symbols having indexes of 1 to 4 of the first slot, the sending sequence is always a PSS, a PBCH, an SSS, and a PBCH. SSB position information carried in the simultaneously transmitted SSB includes the numbering of SSB #0 and information on an offset as shifting forward by 1 symbol.

In the embodiment, multiple candidate transmission positions of a reference signal are obtained from an initial candidate transmission position of the reference signal, and a channel detection is performed before transmitting the reference signal. If the channel is detected to be idle, the reference signal is sent at a corresponding candidate transmission position, thus transmission opportunities of the reference signal can be improved.

Figure 3:
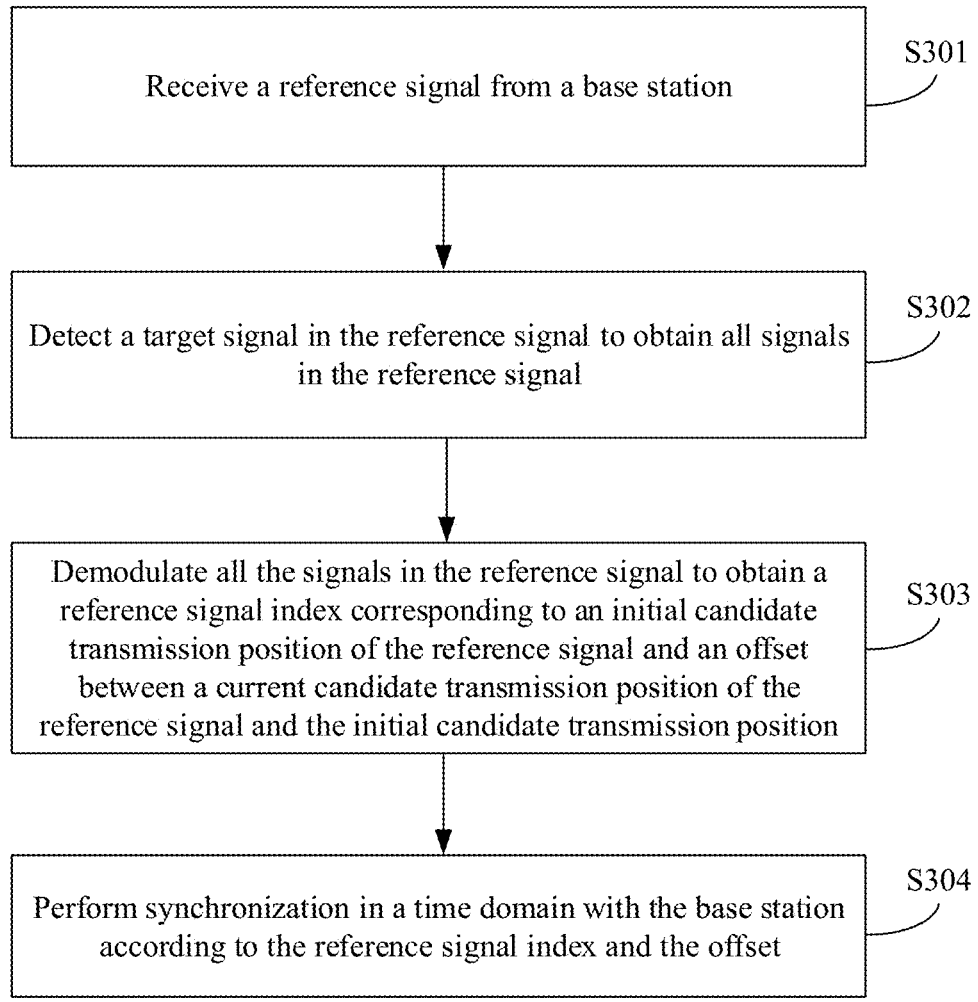
FIG. 3 is a flowchart illustrating a method of receiving a reference signal according to some embodiments of the present disclosure.

FIG. 3 is a flowchart illustrating a method of receiving a reference signal according to some embodiments of the present application. This embodiment is described from a UE side. As shown in FIG. 3, the method includes the following.

At step S301, a reference signal from a base station is received.

The reference signal may include an SSB, or a signal including an SSB, such as a discovery signal in an unlicensed spectrum.

At step S302, a target signal in the reference signal is detected to obtain all signals in the reference signal.

The target signal may include, be is but not limited to, a PSS.

In the embodiment, the target signal in the reference signal can be detected to obtain a position of the target signal, and all the signals in the reference signal can be obtained according to the position of the target signal.

For example, assuming that an index of a symbol where the PSS is located is n, the UE can find symbols having indexes (n+1), (n+2), and (n+3) backwards after detecting the PSS.

At step S303, all the signals in the reference signal are demodulated to obtain a reference signal index corresponding to an initial candidate transmission position of the reference signal and an offset between a current candidate transmission position of the reference signal and the initial candidate transmission position.

After receiving the symbols having indexes n, (n+1), (n+2), and (n+3), a PSS, a PBCH, an SSS and a PBCH are obtained from data in these 4 symbols, and demodulation for the data is performed to obtain an SSB index and an offset.

At step S304, synchronization with the base station in a time domain is performed according to the reference signal index and the offset.

After obtaining the SSB index and the offset, a symbol position of each signal in this SSB can be determined, so as to achieve synchronization with the base station in the time domain.

For example, if the SSB index obtained after demodulation indicates the numbering of SSB #0 and the offset indicates shifting forward by 1 symbol, the UE can determine that the base station transmits the SSB at symbols having indexes of 1 to 4 of the first slot. Therefore, the UE can determine that the time at which the PSS is received corresponds to the time at which the base station transmits the symbol having the index of 1 of the first slot. Thus, synchronization in the time domain between the UE and the base station is realized.

In the embodiment, a target signal in a received reference signal is detected to acquire all signals in the reference signal, and then all the signals in the reference signal are demodulated to obtain a reference signal index corresponding to an initial candidate transmission position of the reference signal and an offset between a current candidate transmission position of the reference signal and the initial candidate transmission position. In this way, synchronization with a base station in the time domain is performed according to the reference signal index and the offset, that is, synchronization with a cell in the time domain through an unlicensed spectrum can be achieved.

Figure 4:
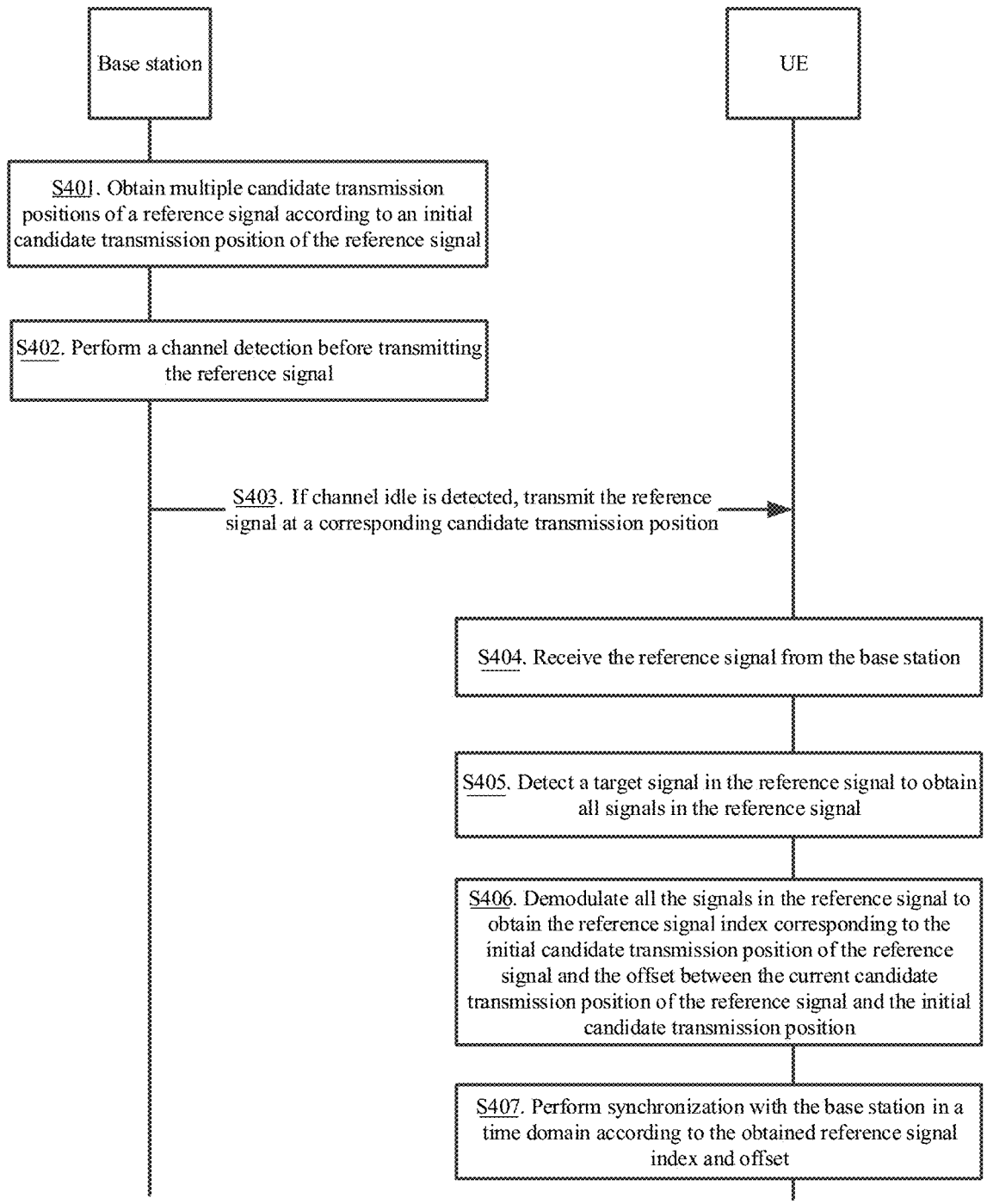
FIG. 4 is a signaling flowchart illustrating a method of receiving a reference signal according to some embodiments of the present disclosure.

FIG. 4 is a signaling flowchart illustrating a method of receiving a reference signal according to some embodiments of the present application. This embodiment is described from the perspective of interaction between a base station and UE. As shown in FIG. 4, the method includes the following.

At step S401, the base station obtains multiple candidate transmission positions of a reference signal according to an initial candidate transmission position of the reference signal.

At step S402, the base station performs a channel detection before transmitting the reference signal.

At step S403, if the base station detects that a channel is idle, the base station transmits the reference signal at a corresponding candidate transmission position, where reference signal position information carried by the reference signal includes a reference signal index corresponding to the initial candidate transmission position and an offset between a current candidate transmission position and the initial candidate transmission position.

In an example, the current candidate transmission position is a candidate transmission position next to the moment of the detection that the channel is idle.

At step S404, the UE receives the reference signal from the base station.

At step S405, the UE detects a target signal in the reference signal to obtain all signals in the reference signal.

At step S406, the UE demodulates all the signals in the reference signal to obtain the reference signal index corresponding to the initial candidate transmission position of the reference signal and the offset between the current candidate transmission position of the reference signal and the initial candidate transmission position.

At step S407, the UE performs synchronization with the base station in a time domain according to the obtained reference signal index and offset.

In the embodiment, by the interaction between the base station and the UE, the base station can increase the transmission opportunities of the reference signal, and the UE can achieve synchronization in the time domain with a cell where the UE is located through an unlicensed spectrum.

Figure 5:
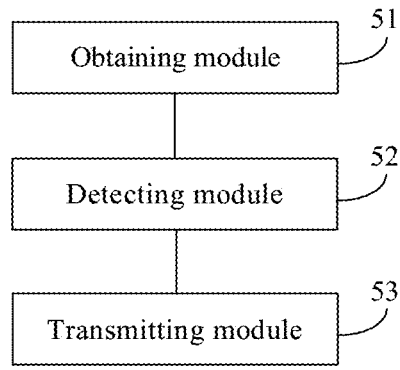
FIG. 5 is a block diagram illustrating an apparatus for transmitting a reference signal according to some embodiments.

FIG. 5 is a block diagram illustrating an apparatus for transmitting a reference signal according to some embodiments. The apparatus may be located in a base station. As shown in FIG. 5, the apparatus includes: an obtaining module 51, a detecting module 52, and a transmitting module 53.

The obtaining module 51 is configured to obtain a plurality of candidate transmission positions of a reference signal according to an initial candidate transmission position of the reference signal, where the plurality of candidate transmission positions include the initial candidate transmission position.

The reference signal may include an SSB, or a signal including an SSB, such as a discovery signal in an unlicensed spectrum.

In the embodiment, the plurality of candidate transmission positions may be obtained by overall shifting signals included in the reference signal from the initial candidate transmission position of the reference signal.

It may further include: determining a corresponding offset according to an overall shifting amount between each candidate transmission position and the initial candidate transmission position.

To clearly describe a process of obtaining the multiple candidate transmission positions and determining the offset, SSB #0 shown in FIG. 2 is taken as an example for description. An initial candidate transmission position of SSB #0 in FIG. 2 is symbols having indexes of 2 to 5. Performing overall shifting on the signals included in SSB #0 in FIG. 2 generates the following multiple candidate transmission positions.

Position 11: symbols having indexes of 0 to 3. The signals sent at the symbols having indexes of 0 to 3 are: a PSS, a PBCH, an SSS, and a PBCH, respectively. This position is shifted forward by 2 symbols relative to the initial candidate transmission position, e.g., the offset is −2.

Position 12: symbols having indexes of 1 to 4. The signals sent at the symbols having indexes of 1 to 4 are: a PSS, a PBCH, an SSS, and a PBCH, respectively. This position is shifted forward by 1 symbol relative to the initial candidate transmission position, e.g., the offset is −1.

Position 13: symbols having indexes of 2 to 5, which is the initial candidate transmission position. The offset is 0.

Position 14: symbols having indexes of 3 to 6. The signals sent at the symbols having indexes of 3 to 6 are: a PSS, a PBCH, an SSS, and a PBCH, respectively. This position is shifted backward by 1 symbol relative to the initial candidate transmission position, e.g., the offset is 1.

Position 15: symbols having indexes of 4 to 7. The signals sent at the symbols having indexes of 4 to 7 are: a PSS, a PBCH, an SSS, and a PBCH, respectively. This position is shifted backward by 2 symbols relative to the initial candidate transmission position, e.g., the offset is 2.

As can be seen, a plurality of candidate transmission positions can be obtained in the above manner. The more candidate transmission positions there are, the more offsets there are, and the more bits used to indicate an offset. In the embodiment, the offset may be limited, for example, only M symbols may be shifted backward, or only N symbols may be shifted forward, etc., where both M and N are integers greater than or equal to 0 and less than or equal to X. X may be set as required, for example, less than or equal to 8. In the embodiment, by limiting the offset, the base station can add as few bits as possible to signaling used to indicate the offset, thereby saving the signaling overhead of the PBCH.

The offset can be indicated in various ways. For example, an offset may be indicated by one or more reserved bits in a PBCH within an SSB, which may be one or more bits used to indicate an SSB index. In a scenario above 6 GHz, initial candidate transmission positions are at most 64, it needs 6 bits to indicate an SSB index, 3 of which are represented by DMRS sequences, and the other 3 bits are carried by PBCH signaling. In a scenario below 6 GHz, since initial candidate transmission positions of SSBs are at most 8, DMRS sequences can be used to indicate these initial candidate transmission positions, and bits in the PBCH reserved for indicating an SSB index can be used for other information. Moreover, an offset may be indicated by adding one or more bits in a PBCH within an SSB (e.g., one or more new bits) or by adding one or more DMRS sequences (e.g., one or more new DMRS sequences).

For example, take the 3 bits in the PBCH within the SSB for indicating an offset as an example, where a correspondence between 3 bits for indicating an offset and offsets may be shown in Table 1.

The detecting module 52 is configured to perform a channel detection before the reference signal is transmitted.

The transmitting module 53 is configured to transmit the reference signal at a corresponding candidate transmission position if channel idle is detected by the detecting module 52, where reference signal position information carried by the reference signal includes a reference signal index corresponding to the initial candidate transmission position and an offset between a current candidate transmission position and the initial candidate transmission position.

In an example, the current candidate transmission position is a candidate transmission position next to the moment of the detection that the channel is idle.

Continuing with the SSB shown in FIG. 2 as an example, if a base station detects channel idle before a 5 ms SSB burst set transmission window, the base station sends an SSB in symbols having indexes of 0 to 3 of the first slot, the sending sequence is always a PSS, a PBCH, an SSS, and a PBCH. SSB position information carried in the simultaneously transmitted SSB includes the numbering of SSB #0 and information on an offset as shifting forward by 2 symbols. If the base station detects that the channel is idle on the first symbol of the first slot, that is, a symbol having an index of 0, the base station sends an SSB in symbols having indexes of 1 to 4 of the first slot, the sending sequence is always a PSS, a PBCH, an SSS, and a PBCH. SSB position information carried in the simultaneously transmitted SSB includes the numbering of SSB #0 and information on an offset as shifting forward by 1 symbol.

In the embodiment, multiple candidate transmission positions of a reference signal are obtained from an initial candidate transmission position of the reference signal, and a channel detection is performed before transmitting the reference signal. If the channel is detected to be idle, the reference signal is sent at a corresponding candidate transmission position, thus transmission opportunities of the reference signal can be improved.

Figure 6:
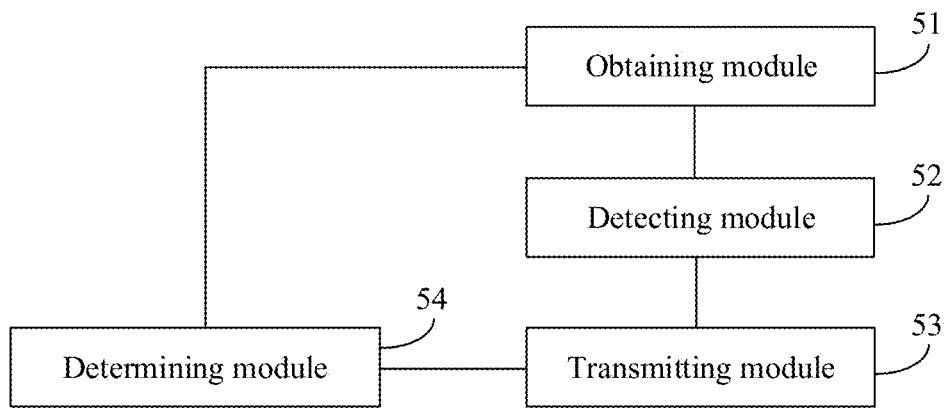
FIG. 6 is a block diagram illustrating another apparatus for transmitting a reference signal according to some embodiments.

FIG. 6 is a block diagram illustrating another apparatus for transmitting a reference signal according to some embodiments. As shown in FIG. 6, based on the embodiment shown in FIG. 5, the apparatus further includes a determining module 54.

The determining module 54 is configured to determine a corresponding offset carried in the reference signal transmitted by the transmitting module 53 according to an overall shifting amount between each candidate transmission position and the initial candidate transmission position.

In the embodiment, the corresponding offset carried in the reference signal sent by the transmitting module is determined according to the overall shifting amount between each candidate transmission position and the initial candidate transmission position, thereby providing conditions for the UE to realize synchronization in the time domain.

Figure 7:
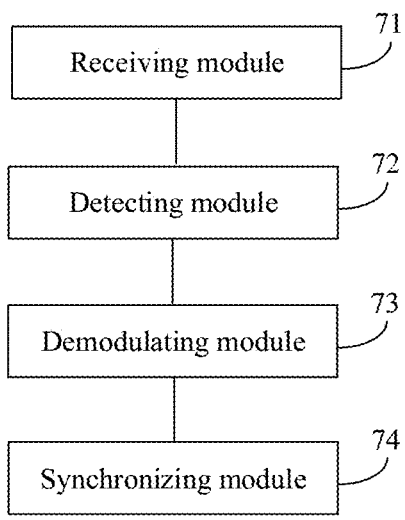
FIG. 7 is a block diagram illustrating an apparatus for receiving a reference signal according to some embodiments.

FIG. 7 is a block diagram illustrating an apparatus for receiving a reference signal according to some embodiments. The apparatus may be located in UE. As shown in FIG. 7, the apparatus includes: a receiving module 71, a detecting module 72, a demodulating module 73, and a synchronizing module 74.

The receiving module 71 is configured to receive a reference signal from a base station.

The reference signal may include an SSB, or a signal including an SSB, such as a discovery signal in an unlicensed spectrum.

The detecting module 72 is configured to obtain all signals in the reference signal received by the receiving module 71 by detecting a target signal in the reference signal.

The target signal may include, be is but not limited to, a PSS.

The demodulating module 73 is configured to obtain a reference signal index corresponding to an initial candidate transmission position of the reference signal and an offset between a current candidate transmission position of the reference signal and the initial candidate transmission position by demodulating all the signals in the reference signal obtained by the detecting module 72.

The synchronizing module 74 is configured to perform synchronization with the base station in a time domain according to the reference signal index and the offset which are obtained by the demodulating module 73.

In the embodiment, a target signal in a received reference signal is detected to acquire all signals in the reference signal, and then all the signals in the reference signal are demodulated to obtain a reference signal index corresponding to an initial candidate transmission position of the reference signal and an offset between a current candidate transmission position of the reference signal and the initial candidate transmission position. In this way, synchronization with a base station in the time domain is performed according to the reference signal index and the offset, that is, synchronization with a cell in the time domain through an unlicensed spectrum can be achieved.

Figure 8:
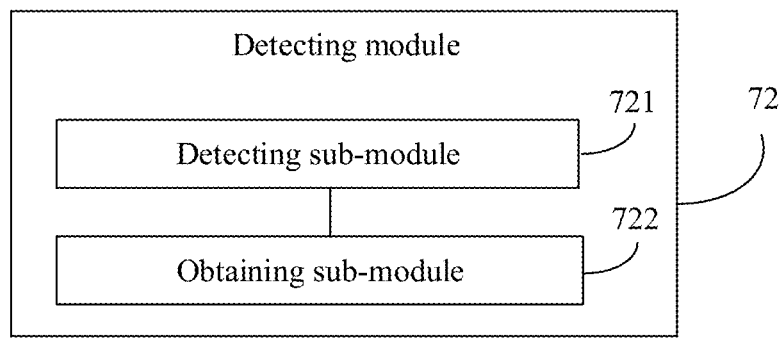
FIG. 8 is a block diagram illustrating another apparatus for receiving a reference signal according to some embodiments.

FIG. 8 is a block diagram illustrating another apparatus for receiving a reference signal according to some embodiments. As shown in FIG. 8, based on the embodiment shown in FIG. 7, the detecting module 72 may include: a detecting sub-module 721 and an obtaining sub-module 722.

The detecting sub-module 721 is configured to obtain a position of the target signal by detecting the target signal in the reference signal.

The obtaining sub-module 722 is configured to obtain all the signals in the reference signal according to the position of the target signal acquired by the detecting sub-module 721.

In this embodiment, a target signal in the reference signal can be detected to obtain a position where the target signal is located, and all the signals in the reference signal can be obtained according to the position where the target signal is located.

For example, assuming that an index of a symbol where the PSS is located is n, the UE can find symbols having indexes (n+1), (n+2), and (n+3) backwards after detecting the PSS.

In the embodiment, the target signal in the reference signal is detected to obtain the position of the target signal, and all the signals in the reference signal are obtained according to the position of the obtained target signal, thereby providing conditions for realizing synchronization in the time domain.

Figure 9:
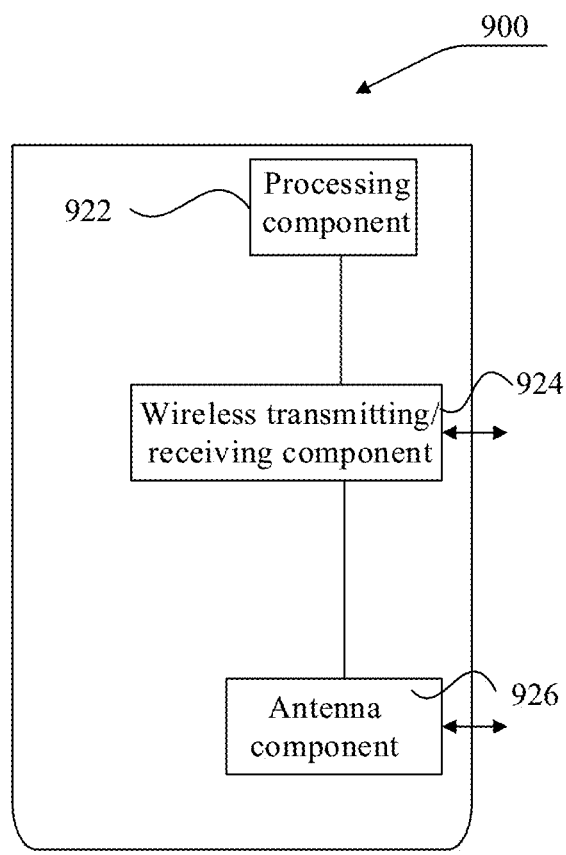
FIG. 9 is a block diagram illustrating an apparatus suitable for transmitting a reference signal according to some embodiments.

FIG. 9 is a block diagram illustrating an apparatus suitable for transmitting a reference signal according to some embodiments. An apparatus 900 may be provided as a base station. As shown in FIG. 9, the apparatus 900 includes a processing component 922, a wireless transmitting/receiving component 924, an antenna component 926, and a signal processing portion specific to a wireless interface. The processing component 922 may further include one or more processors.

One of the processors in the processing component 922 may be configured to:

obtain a plurality of candidate transmission positions of a reference signal according to an initial candidate transmission position of the reference signal, where the plurality of candidate transmission positions include the initial candidate transmission position;

perform a channel detection before the reference signal is transmitted; and if channel idle is detected, transmit the reference signal at a corresponding candidate transmission position, where reference signal position information carried by the reference signal includes a reference signal index corresponding to the initial candidate transmission position and an offset between a current candidate transmission position and the initial candidate transmission position.

In an example, the current candidate transmission position is a candidate transmission position next to the moment of the detection that the channel is idle.

In some embodiments, a non-transitory computer-readable storage medium including instructions is also provided. The instructions can be executed by the processing component 922 of the apparatus 900 to implement the method of transmitting the reference signal. For example, the non-transitory computer-readable storage medium may be a read only memory (ROM), a random-access memory (RAM), CD-ROM, a magnetic tape, a floppy disk, an optical data storage device, and so on.

Figure 10:
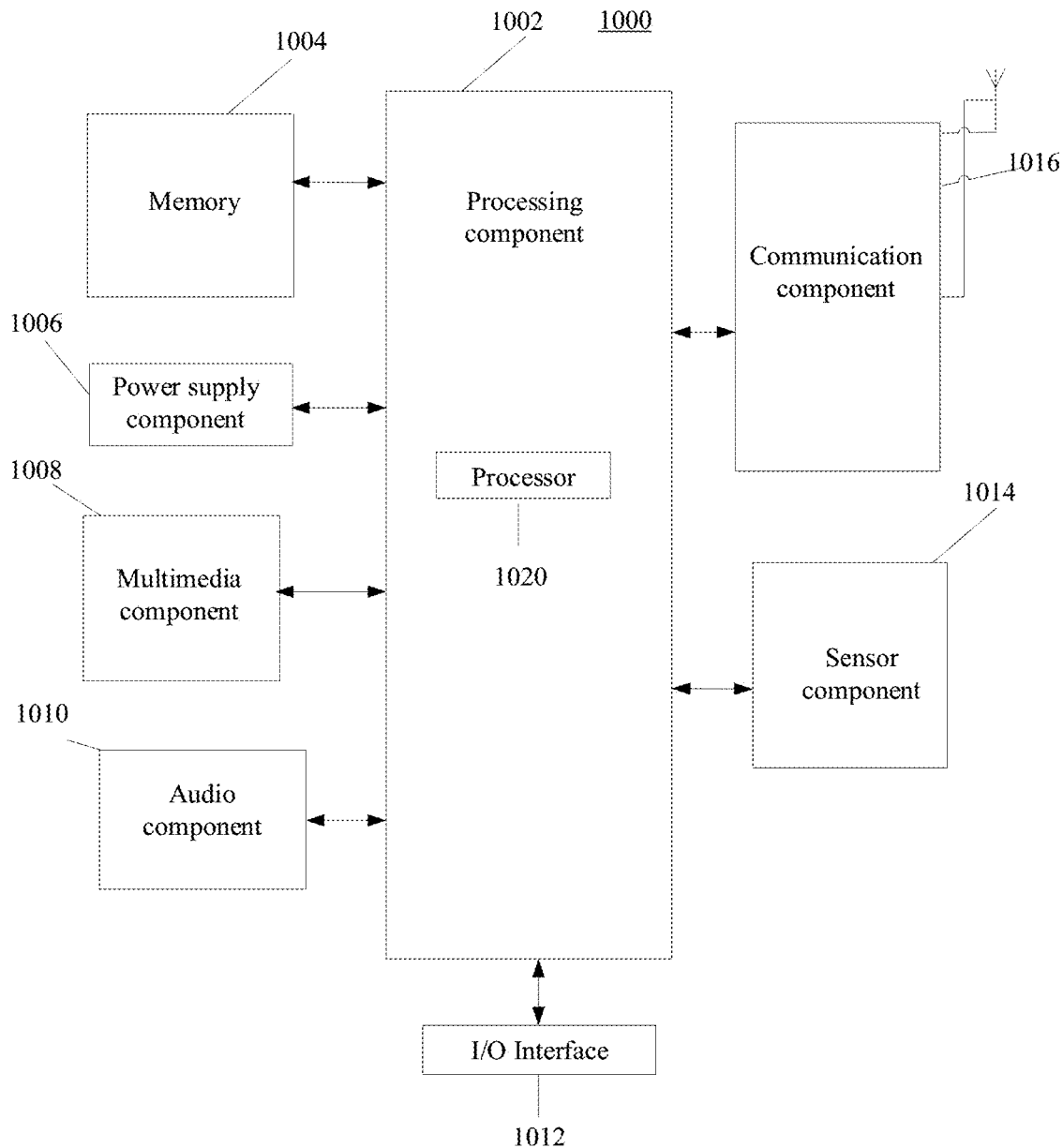
FIG. 10 is a block diagram illustrating an apparatus suitable for receiving a reference signal according to some embodiments.

FIG. 10 is a block diagram illustrating an apparatus suitable for receiving a reference signal according to some embodiments. For example, an apparatus 1000 may be user equipment, such as, a mobile phone, a computer, a digital broadcast terminal, a messaging device, a game console, a tablet device, a medical equipment, a fitness equipment, a personal digital assistant, etc.

As shown in FIG. 10, the apparatus 1000 may include one or more of the following components: a processing component 1002, memory 1004, a power supply component 1006, a multimedia component 1008, an audio component 1010, an input/output (I/O) interface 1012, a sensor component 1014, and a communication component 1016.

The processing component 1002 usually controls overall operations of the apparatus 1000, such as operations associated with display, telephone calls, data communications, camera operations, and recording operations. The processing component 1002 may include one or more processors 1020 to execute instructions to perform all or part of the steps in the methods described above. Moreover, the processing component 1002 may include one or more modules to facilitate interaction between the processing component 1002 and other components. For example, the processing component 1002 may include a multimedia module to facilitate interaction between the multimedia component 1008 and the processing component 1002.

One of the processors 1020 in the processing component 1002 can be configured to:

receive a reference signal from a base station;

obtain all signals in the reference signal by detecting a target signal in the reference signal;

obtain a reference signal index corresponding to an initial candidate transmission position of the reference signal and an offset between a current candidate transmission position of the reference signal and the initial candidate transmission position by demodulating all the signals in the reference signal; and perform synchronization with the base station in a time domain according to the reference signal index and the offset.

The memory 1004 is configured to store various types of data to support operations at the apparatus 1000. Examples of such data include instructions for any application or method operating on the apparatus 1000, contact data, phone book data, messages, pictures, videos, and the like. The memory 1004 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a compact disk.

The power supply component 1006 provides power to various components of the apparatus 1000. The power supply component 1006 may include a power management system, one or more power sources, and other components associated with power generated, managed, and distributed for the apparatus 1000.

The multimedia component 1008 includes a screen that provides an output interface between the apparatus 1000 and a user. In some examples, the screen may include a liquid crystal display (LCD) and a touch panel (TP). In some embodiments, organic light-emitting diode (OLED) or other types of displays can be employed.

If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1008 includes a front camera and/or a rear camera. When the apparatus 1000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some examples, the audio component 1010 also includes a loudspeaker for outputting an audio signal.

The I/O interface 1012 provides an interface between the processing component 1002 and a peripheral interface module which may be a keyboard, a click wheel, a button, or the like. These buttons may include, but are not limited to a home button, a volume button, a start button, and a lock button.

The sensor component 1014 includes one or more sensors for providing a status assessment in various aspects to the apparatus 1000. For example, the sensor component 1014 may detect an open/closed state of the apparatus 1000, and the relative positioning of components, for example, the component is a display and a keypad of the apparatus 1000. The sensor component 1014 may also detect a change in position of the apparatus 1000 or a component of the apparatus 1000, the presence or absence of a user in contact with the apparatus 1000, the orientation or acceleration/deceleration of the apparatus 1000 and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In some examples, the sensor component 1014 may also include an acceleration sensor, a gyro sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as Wi-Fi, 2G, 3G, 4G, or 5G, or a combination thereof. In an example, the communication component 1016 receives broadcast signals or broadcast associated information from an external broadcast management system via a broadcast channel. In an example, the communication component 1016 also includes a near field communication (NFC) module to facilitate short range communication. For example, the NFC module may be implemented based on a radio frequency identification (RFID) technology, an infrared data association (IrDA) technology, an ultra-wide band (UWB) technology, a Bluetooth (BT) technology, and other technologies.

In an example, the apparatus 1000 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing methods described above.

In some embodiments, a non-transitory computer-readable storage medium including instructions is also provided, such as the memory 1004 including instructions. The instructions can be executed by the processor 1020 of the apparatus 1000 to implement the foregoing methods. For example, the non-transitory computer-readable storage medium may be a ROM, a RAM, CD-ROM, a magnetic tape, a floppy disk, an optical data storage device, and so on.

Various embodiments of the present disclosure can have one or more of the following advantages.

Multiple candidate transmission positions of a reference signal are obtained from an initial candidate transmission position of the reference signal, and a channel detection is performed before transmitting the reference signal. If a channel is detected to be idle, the reference signal is sent at a current candidate transmission position, thus transmission opportunities of the reference signal can be improved.

A target signal in a received reference signal is detected to acquire all signals in the reference signal, and then all the signals in the reference signal are demodulated to obtain a reference signal index corresponding to an initial candidate transmission position of the reference signal and an offset between a current candidate transmission position of the reference signal and the initial candidate transmission position. In this way, synchronization with a base station in the time domain is performed according to the reference signal index and the offset, that is, synchronization with a cell in a time domain through an unlicensed spectrum can be achieved.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms, and these phrases may be interchangeably used.

In the present disclosure, it is to be understood that the terms "upper," "center," "length," "front," "back," "left," "right," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," second element may indicate direct contact between the first and second elements, without contact, or indirect through an intermediate medium, unless otherwise explicitly stated and defined.

In the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or applications (apps) can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

In the description of the present disclosure, the terms "one embodiment," "some embodiments," "example," "specific implementation," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method of transmitting a reference signal, being applicable to a base station, and comprising:
   obtaining a plurality of candidate transmission positions of a reference signal according to an initial candidate transmission position of the reference signal, wherein the plurality of candidate transmission positions comprise the initial candidate transmission position;
   performing a channel detection before the reference signal is transmitted; and
   in response to a detection that the channel is idle, transmitting the reference signal at a corresponding candidate transmission position, wherein reference signal position information carried by the reference signal comprises a reference signal index corresponding to the initial candidate transmission position and an offset between a current candidate transmission position and the initial candidate transmission position;
   wherein the obtaining the plurality of candidate transmission positions of the reference signal according to the initial candidate transmission position of the reference signal comprises: obtaining the plurality of candidate transmission positions by overall shifting signals comprised in the reference signal from the initial candidate transmission position of the reference signal in a time domain;
   wherein the obtaining the plurality of candidate transmission positions by overall shifting the signals comprised in the reference signal from the initial candidate transmission position of the reference signal in the time domain comprises:
   overall shifting, with respect to the initial candidate transmission position of the reference signal, the signals comprised in the reference signal forward by N symbols or backward by M symbols in the time domain, wherein M and N are integer values greater than or equal to 0 and less than or equal to 8.

2. The method according to claim 1, further comprising:
   determining a corresponding offset according to an overall shifting amount between each candidate transmission position and the initial candidate transmission position.

3. The method according to claim 1, wherein the reference signal comprises a synchronization signal block (SSB).

4. The method according to claim 1, wherein the reference signal comprises a signal comprising the SSB.

5. The method according to claim 3, wherein the offset is indicated by one or more reserved bits in a physical broadcast channel (PBCH) within the SSB.

6. The method according to claim 3, wherein the offset is indicated by adding one or more bits in the PBCH within the SSB.

7. The base station according to claim 3, wherein the offset is indicated by adding one or more demodulation reference signal (DMRS) sequences.

8. A method of receiving a reference signal, being applied to user equipment (UE), and comprising:
receiving a reference signal from a base station at a current candidate transmission position among a plurality of candidate transmission positions, wherein the plurality of candidate transmission positions comprise an initial candidate transmission position, and the plurality of candidate transmission positions are obtained by overall shifting signals comprised in the reference signal from the initial candidate transmission position of the reference signal in a time domain;
obtaining all signals in the reference signal by detecting a target signal in the reference signal;
obtaining a reference signal index corresponding to the initial candidate transmission position of the reference signal and an offset between the current candidate transmission position of the reference signal and the initial candidate transmission position by demodulating all the signals in the reference signal; and
performing synchronization in a time domain with the base station according to the reference signal index and the offset;
wherein the plurality of candidate transmission positions being obtained by overall shifting the signals comprised in the reference signal from the initial candidate transmission position of the reference signal in the time domain comprises:
overall shifting, with respect to the initial candidate transmission position of the reference signal, the signals comprised in the reference signal forward by N symbols or backward by M symbols in the time domain, wherein M and N are integer values greater than or equal to 0 and less than or equal to 8.

9. The method according to claim 8, wherein the obtaining all the signals in the reference signal by detecting the target signal in the reference signal comprises:
obtaining a position of the target signal by detecting the target signal in the reference signal; and
obtaining all the signals in the reference signal according to the position of the target signal.

10. The method according to claim 8, wherein the reference signal comprises a synchronization signal block (SSB).

11. The method according to claim 8, wherein the reference signal comprises a signal comprising the SSB.

12. The method according to claim 10, wherein the offset is indicated by one or more reserved bits in a physical broadcast channel (PBCH) within the SSB.

13. The method according to claim 10, wherein the offset is indicated by adding one or more bits in the PBCH within the SSB.

14. The method according to claim 10, wherein the offset is indicated by adding one or more demodulation reference signal (DMRS) sequences.

15. A base station, comprising:
a processor, and
memory for storing instructions executable by the processor;
wherein, the processor is configured to:
obtain a plurality of candidate transmission positions of a reference signal according to an initial candidate transmission position of the reference signal, wherein the plurality of candidate transmission positions comprise the initial candidate transmission position;
perform a channel detection before the reference signal is transmitted; and
in response to a detection that the channel is idle, transmit the reference signal at a corresponding candidate transmission position, wherein reference signal position information carried by the reference signal comprises a reference signal index corresponding to the initial candidate transmission position and an offset between a current candidate transmission position and the initial candidate transmission position;
wherein the obtaining the plurality of candidate transmission positions of the reference signal according to the initial candidate transmission position of the reference signal comprises: obtaining the plurality of candidate transmission positions by overall shifting signals comprised in the reference signal from the initial candidate transmission position of the reference signal in a time domain;
wherein the obtaining the plurality of candidate transmission positions by overall shifting the signals comprised in the reference signal from the initial candidate transmission position of the reference signal in the time domain comprises:
overall shifting, with respect to the initial candidate transmission position of the reference signal, the signals comprised in the reference signal forward by N symbols or backward by M symbols in the time domain, wherein M and N are integer values greater than or equal to 0 and less than or equal to 8.

16. The base station according to claim 15, wherein
the reference signal comprises a synchronization signal block (SSB) or a signal comprising the SSB; and
the offset is indicated by at least one of:
one or more reserved bits in a physical broadcast channel (PBCH) within the SSB,
adding one or more bits in the PBCH within the SSB, or
adding one or more demodulation reference signal (DMRS) sequences.

17. User equipment, comprising:
a processor, and
memory for storing instructions executable by the processor;
wherein, the processor is configured to:
receive a reference signal from a base station at a current candidate transmission position among a plurality of candidate transmission positions, wherein the plurality of candidate transmission positions comprise an initial candidate transmission position, and the plurality of candidate transmission positions are obtained by overall shifting signals comprised in the reference signal from the initial candidate transmission position of the reference signal in a time domain;
obtain all signals in the reference signal by detecting a target signal in the reference signal;
obtain a reference signal index corresponding to the initial candidate transmission position of the reference signal and an offset between the current candidate transmission position of the reference signal and the initial candidate transmission position by demodulating all the signals in the reference signal; and
perform synchronization in a time domain with the base station according to the reference signal index and the offset;
wherein the plurality of candidate transmission positions is obtained by overall shifting the signals comprised in the reference signal from the initial candidate transmission position of the reference signal in the time domain comprises:

overall shift, with respect to the initial candidate transmission position of the reference signal, the signals comprised in the reference signal forward by N symbols or backward by M symbols in the time domain, wherein M and N are integer values greater than or equal to 0 and less than or equal to 8.

18. The user equipment according to claim 17, wherein the reference signal comprises a synchronization signal block (SSB) or a signal comprising the SSB; and the offset is indicated by at least one of:

one or more reserved bits in a physical broadcast channel (PBCH) within the SSB, adding one or more bits in the PBCH within the SSB, or adding one or more demodulation reference signal (DMRS) sequences.

19. The user equipment according to claim 17, wherein the user equipment is configured to achieve synchronization with a cell in the time domain through an unlicensed spectrum according to the reference signal index and the offset.

\* \* \* \* \*